(12) United States Patent
Wittkop

(10) Patent No.: US 10,724,878 B2
(45) Date of Patent: Jul. 28, 2020

(54) METHODS AND APPARATUS TO CORRECT REMOTE SENSOR SIGNALS

(71) Applicant: Fisher Controls International LLC, Marshalltown, IA (US)

(72) Inventor: Adam Joseph Wittkop, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 218 days.

(21) Appl. No.: 15/042,981

(22) Filed: Feb. 12, 2016

(65) Prior Publication Data
US 2017/0122782 A1    May 4, 2017

Related U.S. Application Data

(60) Provisional application No. 62/248,766, filed on Oct. 30, 2015.

(51) Int. Cl.
*G01D 18/00* (2006.01)
*G01L 27/00* (2006.01)

(52) U.S. Cl.
CPC ............ *G01D 18/008* (2013.01); *G01L 27/00* (2013.01)

(58) Field of Classification Search
CPC ............................... G01D 18/008; H04L 67/12
See application file for complete search history.

(56) References Cited

U.S. PATENT DOCUMENTS

| 5,265,637 | A | 11/1993 | Gassman et al. |
| 5,434,774 | A | 7/1995 | Seberger |
| 5,439,021 | A | 8/1995 | Burlage et al. |
| 5,451,923 | A | 9/1995 | Seberger et al. |
| 6,351,112 | B1 * | 2/2002 | Felps ................ G01R 1/06788 324/72.5 |

(Continued)

OTHER PUBLICATIONS

Freitag et al., "Calibration Procedures and Instrumental Accuracy Estimates of Tao Temperature, Relative Humidity and Radiation Measurements," US Department of Commerce, National Oceanic and Atmospheric Administration, Environmental Research Laboratories, Pacific Marine Environmental Laboratory, NOAA Technical Memorandum ERL PMEL-104, Dec. 1994, accessed at [www.pmel.noaa.gov/pubs/PDF/frei1589.pdf] on May 26, 2016 (38 pages).

(Continued)

*Primary Examiner* — Matthew E. Gordon
(74) *Attorney, Agent, or Firm* — Hanley, Flight & Zimmerman, LLC

(57) ABSTRACT

Example methods and apparatus to correct remote sensor signals are disclosed. An example apparatus includes a sensor to generate a signal and a first memory to store calibration data associated with the sensor. The example apparatus also includes a second memory to store the calibration data and a first processor proximate to the sensor and the first memory to retrieve the calibration data from the first memory. In addition, the example apparatus includes a second processor, proximate to the second memory and remotely situated relative to the first processor. The second processor is to receive the signal from the sensor, receive the calibration data from first processor, and correct the signal based on the calibration data.

14 Claims, 5 Drawing Sheets

(56) References Cited

U.S. PATENT DOCUMENTS

2009/0309604 A1* 12/2009 Zhang ................. H05F 3/02
324/457
2011/0010035 A1* 1/2011 Weber ................. F02D 41/064
701/31.4

OTHER PUBLICATIONS

Lake et al., "Calibration Procedures and Instrumental Accuracy Estimates of ATLAS Air Temperature and Relative Humidity Measurements," US Department of Commerce, National Oceanic and Atmospheric Administration, Oceanic Atmospheric Research Laboratories, Pacific Marine Environmental Laboratory, NOAA Technical Memorandum OAR PMEL, Apr. 2003 (27 pages).

* cited by examiner

METHODS AND APPARATUS TO CORRECT REMOTE SENSOR SIGNALS

CROSS-REFERENCE TO RELATED APPLICATION

This patent claims priority to U.S. Patent Provisional Application Ser. No. 62/248,766, filed on Oct. 30, 2015, which is incorporated herein by reference in its entirety.

FIELD OF THE DISCLOSURE

This disclosure relates generally to sensor compensation and, more particularly, to methods and apparatus to correct remote sensor signals.

BACKGROUND

Sensors are commonly used to measure process variables (e.g., temperature, pressure, etc.) in process environments (e.g., valves, tanks, supply lines, etc.). Such sensors are often connected to control devices (e.g., valve controllers) located proximate to process environments to generate signals representing the process variables and control actuators (e.g., valves, switches, pumps, etc.) to manage the process variables. Sensors commonly use compensating (e.g., analog) circuitry local to the sensors to correct signals sent to control devices remotely situated from the sensors.

SUMMARY

An example method includes retrieving, with a first processor, calibration data stored in a first memory proximate to the first processor, the calibration data associated with a performance of a sensor proximate to the first processor. The example method also includes sending, with the first processor, the calibration data to a second processor remotely situated relative to the first processor, storing, in a second memory proximate to the second processor, the calibration data sent to the second processor, and receiving, at the second processor, a signal generated by the sensor, the first processor not receiving the signal. In addition, the example method includes correcting, with the second processor, the signal based on the calibration data.

An example apparatus includes a sensor to generate a signal, a first memory to store calibration data associated with the sensor, and a second memory to store the calibration data. The example apparatus also includes a first processor proximate to the sensor and the first memory to retrieve the calibration data from the first memory and a second processor, proximate to the second memory and remotely situated relative to the first processor. In addition, the second processor is to receive the signal from the sensor, receive the calibration data from the first processor, and correct the signal based on the calibration data.

Another example apparatus includes means for generating a signal and first means for storing calibration data associated with the means for generating. The example apparatus includes second means for storing data and means for retrieving the calibration data from the first means for storing, the means for retrieving proximate to the means for generating and the first means for storing. In addition, the example apparatus includes means for receiving the signal from the means for generating, the means for receiving to receive the calibration data from the means for retrieving, and correct the signal based on the calibration data. The means for receiving is proximate to the second means for storing and remotely situated relative to the means for retrieving.

DETAILED DESCRIPTION

Figure 1:
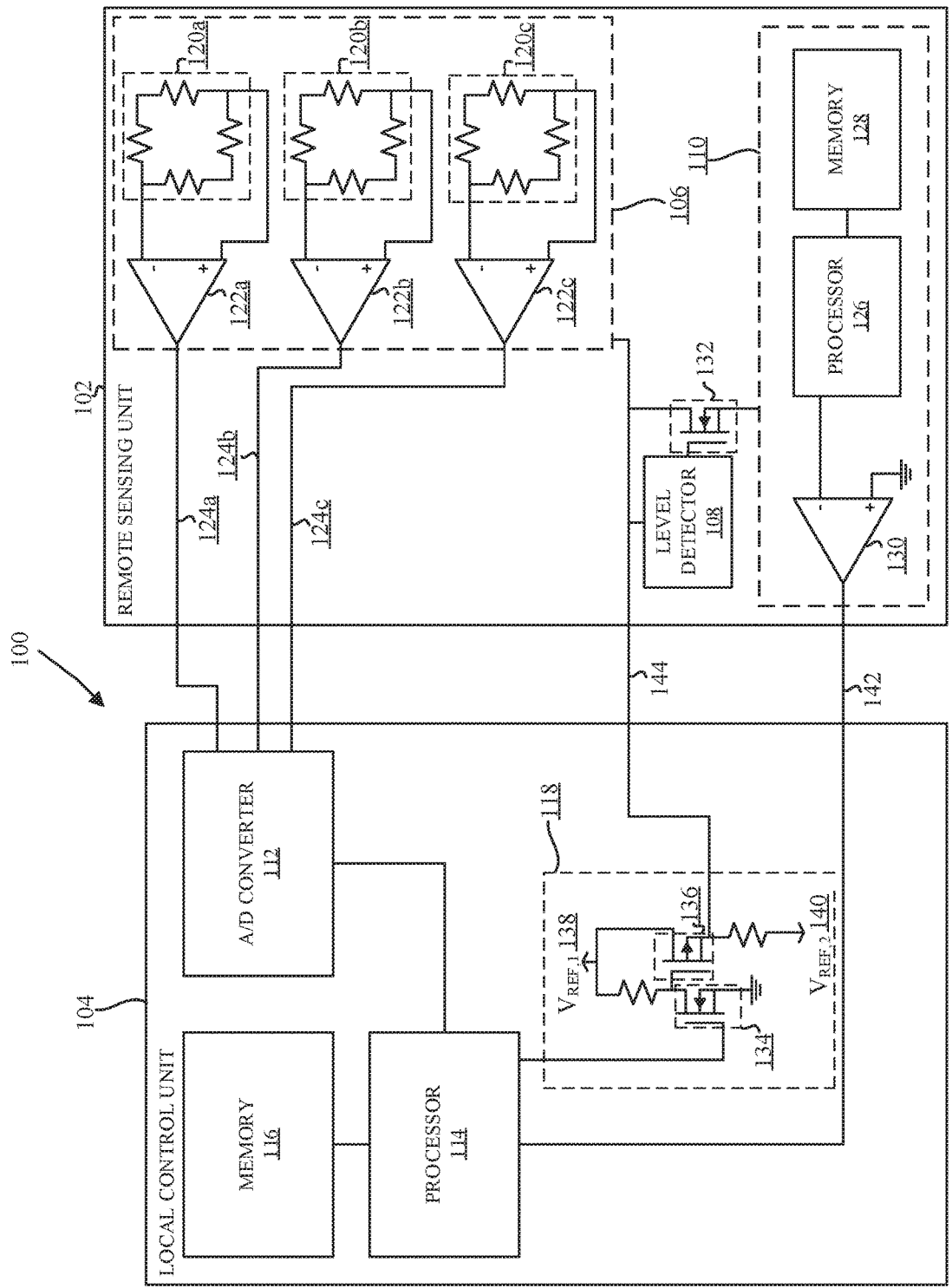
FIG. 1 is a block diagram of an example local control unit and an example remote sensing unit constructed in accordance with the teachings of this disclosure.

Examples disclosed herein enable use of remote sensors utilizing on-board digital compensation, correction, and/or calibration circuitry in harsh environments. In harsh environments, such circuitry may otherwise compromise appropriate correction, compensation, and/or calibration of signals or measurements provided by the remote sensors. In examples disclosed herein, a remote sensing device may be located within a process control system proximate to a portion of the process control system being monitored or controlled. The process control system and the remote sensing device may be located within a harsh environment and, in some instances, the harsh environment may expose the remote sensing device to relatively high or low temperatures, radiation, vibrations, etc.

The remote sensing device may include one or more sensors (e.g., a temperature sensor, a position sensor, etc.), each of which is coupled to conditioning circuitry such as, for example, analog amplifiers, filters, etc. Each of the sensors may measure or detect one or more parameters associated with an operation of the process control system. For instance, one or more of the sensors may detect a position (e.g., an angular position, etc.) of an actuator of the process control system in which the remote sensing device is located. The conditioning circuitry is often robust and, thus, performance of this circuitry may not be adversely affected by the harsh environments to which the remote sensing device may be exposed.

In examples disclosed herein, the remote sensing device may include a processor (e.g., a digital microprocessor) and associated memory. The memory may be used to store sensor compensation, correction, and/or calibration information or values accessible by the processor. Such information may be used to correct, compensate, and/or calibrate the signals provided by the sensors of the remote sensing device. However, unlike the conditioning circuitry, the processor and the memory may be more sensitive to the harsh environment to which the remote sensing device is exposed. In such examples, the processor and the memory may not operate reliably when exposed to the harsh environment.

In operation, the examples disclosed herein use the processor in the remote sensing device to send the compensation, correction, and/or calibration information or values stored in the memory of the remote sensing device to a local control device. The local control device is remotely situated relative to the remote sensing device and is not located within the harsh environment in which the remote sensing device is located. The local control device may include a processor to store the compensation, correction, and/or calibration information or values in a memory of the local control device.

In examples disclosed herein, the local control device may request the compensation, correction, and/or calibration information from the remote sensing device. In such examples, the processor of the local control device may request the compensation, correction, and/or calibration information by delivering a signal to the remote sensing device. The processor of the remote sensing device may be configured to transmit the compensation, correction, and/or calibration information to the processor of the local control device upon receipt of the request or signal. Once the local control device has received the compensation, correction, and/or calibration information from the remote sensing device, the processor and the memory of the remote sensing device may be deactivated. However, the sensors and the conditioning circuitry may continuously or periodically provide sensor signals to the local control device to implement, for example, one or more process control loops, monitor one or more process parameters, etc.

Advantageously, the sensor signals received by the local control device are corrected, compensated, and/or calibrated by the processor of the local control device using the calibration information previously received from the remote sensing device, thereby enabling the local control device to provide more accurate control, monitoring, and resolution. In this manner, the harsh environment with a potential to compromise operation of the processor or memory of the remote sensing device does not affect the continued or periodic operation of a process being monitored and/or controlled by the process control system. The local control device continues to receive sensor signals or measurements from the remote sensing device and corrects or compensates such signals or measurements at the local control device, which is not exposed to the harsh environment.

In examples disclosed herein, the compensation, correction, and/or calibration information or values may be stored in the memory of the remote sensing device at a time of manufacture of the remote sensing device. The information or values may subsequently be sent to the local control device at a time the remote sensing device is commissioned (e.g., a time when the process control system is not operating to control the process) and/or more generally at a time when the remote sensing device is not exposed to a harsh environment that could compromise functionality or operation of the processor and the memory of the remote sensing device.

In examples disclosed herein, the remote sensing device may be integrated with other devices such as, for example, a valve controller, an actuator, a valve and/or any other process device. Alternatively, the remote sensing device may be a separate device(s). In examples disclosed herein, the local control device may be integrated with other devices such as, for example, a pneumatic relay, a transducer, a pressure switch and/or any other device to control a process. Alternatively, the local control device may be a separate device(s).

FIG. 1 depicts an example process control environment 100 that enables correction of remote sensor signals. The process control environment 100 includes an example remote sensing unit 102 and an example local control unit 104.

The remote sensing unit 102 senses, measures, and/or detects, one or more parameters associated with an operation of the process control environment 100. The remote sensing unit 102 also sends or transmits compensation data, correction data, calibration data, lookup tables, instructions, equations, etc. generally referred to herein as "data," to the local control unit 104. The remote sensing unit 102 is located within a process environment such as, for example, a tank, a supply line, a valve, etc. In some examples, the remote sensing unit 102 may be exposed to a harsh process environment that exhibits relatively high or low temperatures, radiation, vibrations, etc. However, in other examples, the remote sensing unit 102 may be situated adjacent to, but not within, a process environment. Additionally or alternatively, a portion of the remote sensing unit 102 may be exposed to a process environment, whereas another portion of the remote sensing unit 102 may not be exposed to the process environment and may be remotely situated relative to the portion that is exposed to the process environment. In one particular example, the remote sensing unit 102 may be implemented within a Fisher® FIELDVUE™ DVC6215 digital valve controller developed and sold by Emerson Process Management®. In other examples, any other suitable sensing platform may be used to implement the example remote sensing unit 102. The remote sensing unit 102 also includes example sensor circuitry 106, an example level detector 108, and an example processing unit 110.

The local control unit 104 receives sensor signals from the remote sensing unit 102. The local control unit 104 also requests the remote sensing unit 102 to send or transmit data. In examples disclosed herein, the local control unit 104 corrects, calibrates, and/or compensates the sensor signals received from the remote sensing unit 102. In examples disclosed herein, the local control unit 104 may monitor and control the process control environment 100 and, in particular, control process variables (e.g., temperature, pressure, actuator/valve stem position, etc.) within process environments (e.g., valves, tanks, supply lines, etc.). The local control unit 104 is remotely situated relative to the remote sensing unit 102. In examples disclosed herein, the local control unit 104 may be mounted to a wall, a pipe stand, etc. or any other suitable means for affixing, fastening, appending, etc. In some examples, the local control unit 104 may be implemented by a Fisher® FIELDVUE™ DVC6205 digital valve controller developed and sold by Emerson Process Management®. In other examples, any other suitable control platform or device may be used to implement the local control unit 104. The local control unit 104 includes an example analog-to-digital (A/D) converter 112, an example processor 114, an example memory 116, and an example switch 118.

In examples disclosed herein, the remote sensing unit 102 and the local control unit 104 are connected, coupled, linked, etc. by any of a wireless connection(s), a wire(s), a cable(s), a conducting strand(s), and/or any other suitable means for communicatively coupling the local control unit 104 to the remote sensing unit 102. In examples disclosed herein, any of the wireless connection(s), the wire(s), the cable(s), the conducting strand(s), and/or the any other suitable means for communicatively coupling the local control unit 104 to the remote sensing unit 102 may be exposed to moderate conditions (e.g., standard temperature and pressure (STP)) within the process control environment 100 rather than harsh conditions. In examples disclosed herein, the remote sensing unit 102 and the example local control unit 104 may be configured to communicate via the wireless connection(s), the wire(s), the cable(s), the conducting strand(s), etc. using a highway addressable remote transducer (HART®) protocol, a process field bus (PROFIBUS) protocol, or any other analog or digital industrial automation protocol.

In the illustrated example of FIG. 1, the example sensor circuitry 106 is any type(s) of electrical circuitry and/or device(s) configured to sense, measure, and/or detect process variables, parameters, and/or characteristics associated with an operation of the process control environment 100. For example, the sensor circuitry 106 may sense a temperature of a process element within a process environment such as, for example, a temperature of a liquid flowing through a valve. In other examples, the sensor circuitry 106 may detect a movement, or a change of position, of an actuator configured to control process elements such as, for example, liquids and/or gases in the process control environment 100. In such examples, an actuator may be moved or re-positioned to allow more or less liquid to flow via a valve and the sensor circuitry 106 may subsequently measure the change in position of the actuator. The sensor circuitry 106 may be exposed to, or susceptible to interfacing (e.g., contacting, touching, etc.) with, process elements of the process environment (e.g., gases, liquids, etc.). In examples disclosed herein, the sensor circuitry 106 may be immersed in, submerged in, or otherwise exposed to a harsh process environment. The sensor circuitry 106 includes example sensors 120a-c and example signal conditioning circuits 122a-c.

The example sensors 120a-c sense, measure, and/or detect process variables, parameters, and/or characteristics of process elements in the process control environment 100. In examples disclosed herein, the sensors 120a-c may include, for example, temperature sensors (e.g., thermocouples, thermostats, thermistors, etc.) configured to sense a temperature of a process element(s), such as a liquid. In some examples, the sensors 120a-c may include position sensors configured to detect a position of an actuator in the process control environment 100 such as, for example, a position of an actuator. In some examples, the sensors 120a-c may monitor a position of a valve stem in a valve. In other examples, the sensors 120a-c may include pressure sensors (e.g., differential pressure sensors, piezo-resistive strain gauges, vacuum pressure sensors, etc.) configured to measure a pressure within the process control environment 100. For example, the sensors 120a-c may be pressure sensors submerged in natural gas permeating via a valve and configured to detect pressure within the valve. In examples disclosed herein, the sensors 120a-c may sense, measure, and/or detect, any other process variable(s), parameter(s), and/or characteristic(s) of the process control environment 100.

The sensors 120a-c generate signals, referred to herein as "sensor signals," indicative of the process variable(s), the parameter(s), and/or the characteristic(s) being measured, sensed, and/or detected. In some examples, the sensors 120a-c may be of a same or a different type(s). For example, the sensor 120a may be a temperature sensor and the sensors 120b-c may be position sensors. In some examples, the sensors 120a-c generate sensor signals indicative of a pressure within a valve. Although, three sensors are depicted in the example of FIG. 1, any number and/or type(s) of sensor(s) may be used within the remote sensing unit 102. Each of the sensors 120a-c is electrically connected to a respective one of the signal conditioning circuits 122a-c. For example, the sensor 120a is connected to the signal conditioning circuit 122a, the sensor 120b is connected to the signal conditioning circuit 122b, and the sensor 120c is connected to the signal conditioning circuit 122c. However, the sensors 120a-c may be coupled to any number of conditioning circuits. In examples disclosed herein, the sensors 120a-c deliver the sensor signals to the conditioning circuits 122a-c.

The signal conditioning circuits 122a-c are configured to manipulate, modify, or condition sensor signals generated by the sensors 120a-c. In some examples, the signal conditioning circuits 122a-c may include operational amplifiers as is depicted in the example of FIG. 1. The signal conditioning circuits 122a-c may amplify the sensor signals to magnitudes or forms that are easily detectable by the example processor 114 and the example A/D converter 112. Additionally or alternatively, the signal conditioning circuits 122a-c may include high pass or low pass filters. In such examples, the signal conditioning circuits 122a-c may filter certain frequencies, or frequency ranges, generated by the sensors 120a-c. In this manner, the signal conditioning circuits 122a-c may prevent a sensor signal or a portion thereof of a certain type(s), magnitude, and/or frequency from being delivered to the local control unit 104. In examples disclosed herein, the signal conditioning circuits 122a-c may be configured to modify or condition sensor signals in any suitable manner. In examples disclosed herein, each of the signal conditioning circuits 122a-c is electrically connected to the A/D converter 112 via example connections 124a-c, respectively.

The example connections 124a-c may be implemented by any of a wireless connection(s), a wire(s), a cable(s), a conducting strand(s), or any other suitable means for electrically connecting the signal conditioning circuits 122a-c to the A/D converter 112. In examples disclosed herein, the connections 124a-c deliver or transmit sensor signals to the A/D converter 112 from the sensors 120a-c. The sensor signals may be delivered to the A/D converter 112 continuously or until the connections 124a-c are detached or separated from the remote sensing unit 102 and/or the local control unit 104. It should be noted that the sensor signals generated and conditioned by the sensor circuitry 106 are not delivered to a processor 126 of the remote sensing unit 102.

In some examples, the connections 124a-c are configured to support any type(s) of communication protocol such as, for example, a highway addressable remote transducer (HART®) protocol, a process field bus(PROFIBUS) protocol, or any other digital or analog industrial automation protocol. Additionally, the connections 124a-c are appendable to, or may be disconnect from, the A/D converter 112. The connections 124a-c may be configured to enable a user within the process control environment 100 such as, for example, a technician, to connect the sensor circuitry 106 to, and to disconnect the sensor circuitry 106 from, the A/D converter 112.

In the illustrated example, the signal conditioning circuit 122a is connected to the A/D converter 112 via the connection 124a, the signal conditioning circuit 122b is connected to the A/D converter 112 via the connection 124b, and the signal conditioning circuit 122c is connected to the A/D converter 112 via the connection 124c. While the connections 124a-c are depicted in the illustrated example of FIG. 1, it should be understood that any number of connections 124a-c may exist between the sensor circuitry 106 and the A/D converter 112. In some examples, a number of connections between the sensor circuitry 106 and the A/D converter 112 may be dependent on a number of sensors 120a-c included within the remote sensing unit 102. In some examples, the sensor circuitry 106 may be electrically connected to the A/D converter 112 via a single connection.

The example level detector 108 is configured to receive a request (e.g., a signal) from the local control unit 104 and to activate, or provide electrical power to, the processing unit 110. In some examples, the level detector 108 receives a signal of a certain magnitude from the local control unit 104 and directs electrical power to the processing unit 110. In other examples, the level detector 108 compares a signal received from the local control unit 104 to a threshold value. The threshold value may define a minimum or a maximum magnitude of a signal required to activate, or turn on, the processing unit 110. When the signal or request delivered to the level detector 108 satisfies (e.g., exceeds) the threshold value, electrical power may be subsequently delivered to the processing unit 110. In other such examples, when the signal delivered to the level detector 108 does not satisfy the threshold, the level detector 108 may prevent electrical power from being delivered to the processing unit 110. In some examples, the level detector 108 may be any of a switch, a diode, and/or circuitry of any type configured to detect a voltage or signal level and/or relay electrical power to the processing unit 110.

In examples disclosed herein, the level detector 108 is electrically connected to the example processing unit 110 via an example transistor 132. The transistor 132 may be a complementary metal-oxide semiconductor (CMOS) transistor or any other type(s) of transistor utilizing any type(s) of semiconductor substrate. Implementation of the transistor 132 is not limited to a single transistor and, alternatively, any number of transistors may be used to implement the transistor 132. In examples disclosed herein, the level detector 108 may provide electrical power to the processing unit 110 via the transistor 132. In some examples, the transistor 132 is implemented as an electrical switch that conducts when the level detector 108 receives a request that satisfies a threshold value, thereby delivering electrical power to the processing unit 110. It should be understood that the transistor 132 may be implemented by any means of electrically connecting the level detector 108 to the processing unit 110. Additionally or alternatively, the remote sensing unit 102 may be implemented and operable without the transistor 132. In such examples, the level detector 108 may directly prevent electrical power from being, or permit electrical power to be, provided to the processing unit 110. It should also be understood that the transistor 132 may be replaced and/or implemented by any electrical circuit(s).

The example processing unit 110 is any electronic circuitry capable of carrying out or executing instructions by performing any of arithmetic operations, logical operations, control operations, etc. and storing information. The processing unit 110 stores data that may be used to compensate, correct, and/or calibrate sensor signals generated by the sensors 120a-c. The processing unit 110 is also configured to send the data to the local control unit 104. The processing unit 110, in some examples, is installed within the remote sensing unit 102 at a time of manufacture. During normal operation of the remote sensing unit 102, the processing unit 110 is inoperable and is not supplied electrical power. As used herein, normal operation refers to operation of the process control environment 100 where sensor(s) signals are conveyed to the local control unit 104 from the remote sensing unit 102 and wherein process elements pass through process environments (e.g., fluid flows through a valve, gas permeates through a supply line, etc.). The level detector 108 prevents the processing unit 110 from operating during normal operation. In examples disclosed herein, the level detector 108 may activate the processing unit 110 as a result of operations performed by the local control unit 104. The processing unit 110 includes the example processor 126, an example memory 128, and an example operational amplifier 130.

The example processor 126 is a microprocessor and/or any other type of processing unit configured to access and retrieve data from the example memory 128. The processor 126 also sends or transmits data to the local control unit 104 upon request. The processor 126 is proximate to the memory 128 and the sensor circuitry 106. In examples disclosed herein, the processor 126 is de-activated, or powered off, during normal operation of the remote sensing unit 102. However, in examples disclosed herein, the processor 126 may be activated and provided electrical power from the level detector 108 based on operations performed by the local control unit 104.

The memory 128 stores data and is accessible by the processor 126. In examples disclosed herein, the memory 128 may be implemented by a non-volatile memory (e.g., a flash memory, a read-only memory, a magnetic computer storage device, etc.). The memory 128 may additionally or alternatively be implemented by one or more mass storage devices such as a hard drive disk(s), a compact disk drive(s), a digital versatile disk drive(s), etc.

In examples disclosed herein, the memory 128 stores data. In some examples, the memory 128 stores data associated with a performance(s) of the sensors 120a-c. For example, the memory 128 may store data including applicable offsets, gains, linearization relationships, etc. to be applied to a sensor signal(s) by a processor to effectively correct, calibrate, and/or compensate the sensor signal(s). In such examples, the data may be used by a processor to modify or adjust the sensor signal(s) to increase accuracy or precision. As such, a processor may interpret and apply the data stored in the memory 128 to determine an accurate magnitude or value of a sensor signal(s) that may otherwise be inaccurate or erroneous. In some examples, the data is stored in the memory 128 at a time of manufacture of the sensing unit 102. In examples disclosed herein, the memory 128 is not accessible by the processor 126 unless the processing unit 110 is supplied electrical power by the level detector 108.

When the processing unit 110 is operable, activated, or provided electrical power, the processor 126 accesses and/or retrieves data from the memory 128 and sends or transmits the data to the local control unit 104 via the example operational amplifier 130. The operational amplifier 130 amplifies a signal(s) carrying, and/or indicative of, the data stored in the memory 128 to a magnitude or value detectable or discernible by the local control unit 104. In examples disclosed herein, the data sent or transmitted to the local control unit 104 is subsequently stored in the local control unit 104. Although only one operational amplifier is depicted in the illustrated example of FIG. 1, any number of operational amplifiers may be used to amplify the signal(s) carrying the data stored in the memory 128.

When the processing unit 110 is inoperable, de-activated, or not provided electrical power, the operational amplifier 130 does not receive electrical power and, thus, does not amplify a signal indicative of the data stored in the memory 128. As such, the operational amplifier 130 is inoperable when the processing unit 110 is de-activated (e.g., during normal operation).

Turning to the local control unit 104 of FIG. 1, the example A/D converter 112 is configured to convert analog signals to digital signals. The A/D converter 112 may also be implemented by any type(s) of circuit(s) and/or integrated circuit(s). In examples disclosed herein, the A/D converter 112 receives sensors signals (e.g., in analog form) from the remote sensing unit 102 and converts the analog sensors signals to a digital form. The A/D converter 112 subsequently delivers the digitized sensor signals to the processor 114. Although only one A/D converter is depicted in the illustrated example of FIG. 1, any number of A/D converters may be implemented in the local control unit 104.

The example processor 114 of the local control unit 104 is a microprocessor and/or any other type(s) of central processing unit configured to access and to retrieve information from the example memory 116. The processor 114 is proximate to the memory 116 and the A/D converter 112. The processor 114 is also configured to receive data from the remote sensing unit 102. In particular, the processor 114 receives data sent or transmitted from the processor 126. In examples disclosed herein, the processor 114 stores the received data in the memory 116. The processor 114 may access the memory 116 and determine whether sufficient resources and/or information is/are stored therein that may be used to determine a measurement. In some examples, the processor 114 may request the processor 126 to access and/or to retrieve data from the memory 128 and to send the data. The data requested from the processor 126 may include lookup tables and/or any other means for relating electrical units of measure to physical quantities (e.g., milli-volts to degrees Celsius, micro-amps to Pascals, etc.) useful for determining a measurement value. In such examples, the processor 114 may be configured to operate the example switch 118. Specifically, in some examples, the processor 114 may output a signal to the switch 118 to initiate a request for the data stored in the memory 128. In examples disclosed herein, the processor 114 is also configured to correct, calibrate, and/or compensate sensor signals received from the remote sensing unit 102 with data received from the remote sensing unit 102.

The example memory 116 stores information and is accessible by the processor 114. In examples disclosed herein, the memory 116 may be implemented using a medium similar to the memory 128. For example, the memory 128 is implemented by a non-volatile memory (e.g., a flash memory, a read-only memory (ROM), a magnetic computer storage device, etc.), a volatile memory (e.g., a random-access memory (RAM)) and/or one or more mass storage devices such as a hard drive disk(s), a compact disk drive(s), a digital versatile disk drive(s), etc. In examples disclosed herein, the memory 116 stores data requested and received from the remote sensing unit 102.

The switch 118 is configured to receive a signal from the processor 114 and deliver a different signal as a request for data to the remote sensing unit 102. Although an example implementation of the switch 118 is illustrated in FIG. 1, the switch 118 may be implemented by any circuit(s) or device(s). In examples disclosed herein, the switch 118 may be implemented by any suitable means for transmitting and relaying a request for data to the remote sensing unit 102. In the illustrated example of FIG. 1, the switch 118 includes example transistors 134, 136 and is supplied example reference voltages $V_{REF,\ 1}$ 138 and $V_{REF,\ 2}$ 140.

In examples disclosed herein, the processor 114 of the local control unit 104 is connected to the remote sensing unit 102 by an example connection 142. The example connection 142 may be implemented in any suitable manner similar or identical to the example connections 124a-c.

In examples disclosed herein, the processor 114 of the local control unit 104 is also connected to the remote sensing unit 102 via the switch 118 and an example connection 144. The connection 144 may be implemented in any suitable manner similar or identical to the connections 124a-c, 142.

In some examples, the connections 124a-c, 142, and 144 may include any number of wireless connections and/or may be implemented using any number of wires, cables, or conducting strands coupling the remote sensing unit 102 to the local control unit 104.

In examples disclosed herein, the processor 114 of the local control unit 104 requests transmission of data stored in the memory 128 using the switch 118. In the illustrated example of FIG. 1, the processor 114 transmits a signal(s) to the switch 118 for the data stored in the memory 128. In some examples, the processor 114 transmits a signal(s) to the switch 118 during a commissioning period, a calibration period, or an outage. A commissioning period as used herein refers to a period in which operation and/or compatibility of the local control unit 104 with the remote sensing unit 102 is set up and/or configured. For example, during a commissioning period, the local control unit 104 may be initially connected (e.g., from a disconnected state) to the remote sensing unit 102 by a person who affixes the local control unit 104 to the remote sensing unit 102 via the connections 124a-c, 142, 144. A calibration period as used herein refers to a period in which the sensors 120a-c are tested and/or adjusted to check for and/or to determine accuracy and precision. In some examples, calibrating instruments and/or processors may be appended to the remote sensing unit 102 and/or the local control unit 104 by authorized personnel during a calibration period. As used herein, an outage refers to a period in which process elements (e.g., liquids, gases, etc.) temporarily cease to progress or flow via process environments (e.g., valves, supply lines, etc.). In examples disclosed herein, progression or flow of process elements via process environments may cease during any of a commissioning period, a calibration period, or an outage. Additionally, the processor 114 may transmit a signal(s) to the switch 118 during any of a commissioning period, a calibration period, and/or an outage when the connections 124a-c, 142, 144 are provided to the remote sensing unit 102 and the local control unit 104. In some examples, the remote sensing unit 102 may be detached or disengaged from the local control unit 104 and replaced with a new or different remote sensing unit 102 during any of a commissioning period, a calibration period, or an outage. In examples disclosed herein, the process control environment 100 is subject to normal operation unless any of a commissioning period, a calibration period, and/or an outage transpires.

The signal(s) transmitted by the processor 114 to the switch 118 (e.g., during any of a commissioning period, a calibration period, or an outage causes the switch 118 to deliver a signal to the level detector 108 that satisfies a threshold value.

In examples disclosed herein, one of the example reference voltages $V_{REF,\ 1}$ 138, $V_{REF,\ 2}$ 140 is supplied to the level detector 108 during normal operation of the process control environment 100. In the illustrated example of FIG. 1, the reference voltages $V_{REF,\ 1}$ 138, $V_{REF,\ 2}$ 140 supplied to the switch 118 are of different magnitudes. The one of the reference voltages $V_{REF,\ 1}$ 138, $V_{REF,\ 2}$ 140 supplied to the level detector 108 during normal operation of the process control environment 100 causes the level detector 108 to prevent electrical power from being provided to the processing unit 110. In some examples, the level detector 108 prevents electrical power from being provided to the processing unit 110 by comparing the supplied reference voltage (e.g., either reference voltage $V_{REF,\ 1}$ 138 or $V_{REF,\ 2}$ 140) to a threshold value and ceasing delivery of electrical power to the processing unit 110.

When the signal(s) is transmitted by the processor 114 to the switch 118, the transmitted signal(s) causes a different one of the reference voltages $V_{REF, 1}$ 138, $V_{REF, 2}$ 140 to be provided to the level detector 108. For example, if the reference voltage $V_{REF, 1}$ 138 is delivered to the level detector 108 during normal operation of the process control environment 100, the signal(s) transmitted to the switch 118 causes the switch 118 to deliver the reference voltage $V_{REF, 2}$ 140 to the level detector 108. Alternatively, if the reference voltage $V_{REF, 2}$ 140 is delivered to the level detector 108 during normal operation of the process control environment 100, the signal(s) transmitted to the switch 118 causes the switch 118 to deliver the reference voltage $V_{REF, 1}$ 138 to the level detector 108. As such, the different one of the reference voltages $V_{REF, 1}$ 138, $V_{REF, 2}$ 140 delivered to the level detector 118 causes the level detector 108 to provide electrical power to the processing unit 110. In some examples, the level detector 108 identifies that the provided signal or voltage satisfies a threshold value. In this manner, the level detector 108 may detect the different one of the reference voltages $V_{REF, 1}$ 138, $V_{REF, 2}$ 140 and facilitate providing electrical power to the processor 126, the memory 128, and the operational amplifier 130 via the transistor 132. In examples disclosed herein, the different one of the reference voltages $V_{REF, 1}$ 138, $V_{REF, 2}$ 140 may supply electrical power to the processing unit 110. Subsequently, the processor 126 is configured to access and to retrieve data from the memory 128 and to transmit the data to the processor 114 via the operational amplifier 130.

Although the processor 114 is configured to request data from the remote sensing unit 102 during any of commissioning periods, calibration periods, and/or outages, the processor 114 is also configured to request data from the remote sensing unit 102 dependent on or independent of human involvement and/or a user instruction(s). For example, the processor 114 may be instructed by an authorized user during any of a commissioning period, a calibration period, or an outage to request data from the memory 128. In such examples, the authorized user may connect another device to the local control unit 104 and utilize configuration software to facilitate operation of the processor 114. In other examples, the processor 114 may be configured to automatically request data from the remote sensing unit 102 at periodic or aperiodic intervals during any of commissioning periods, calibration periods, and/or outages independent of human involvement. In such examples, the processor 114 may deliver, at periodic or aperiodic intervals, a signal(s) to the switch 118 to activate the processing unit 110. In other examples, the processor 114 may be configured to automatically request data from the remote sensing unit 102 when the process control environment 100 is not operating during a commissioning period, a calibration period, and/or an outage. In such examples, the processor 114 may be configured to interrupt normal operation of the process control environment 100 and request data from the remote sensing unit 102 by activating the processing unit 110. In the aforementioned example, the processor 114 may request data from the processor 126 by causing the level detector 108 to deliver electrical power during normal operation of the process control environment 100.

In examples disclosed herein, the processor 114 uses the data received from the processor 126 to correct, calibrate, and/or compensate sensor signals. The processor 114 may compare a magnitude of the digitized sensor signal(s) received from the A/D converter 112 to the data received from the processor 126 to appropriately correct, calibrate, and/or compensate the sensor signal(s). For example, certain ones of the sensors 120a-c may sense, measure, and/or detect a process variable, a parameter, and/or a characteristic of a process element and/or a process environment and generate a sensor signal that varies non-linearly with the process variable, the parameter, and/or the characteristic being sensed, measured, and/or detected. As such, the processor 114, in some examples, may use the data to adjust or modify a numerical coefficient(s) defined by an equation characterizing a non-linear relationship between the sensor signal and the process variable, the parameter, and/or the characteristic being sensed, measured, and/or detected. For example, a voltage or a current present at ones of the sensors 120a-c may vary exponentially with pressure change. In examples disclosed herein, the processor 114 may use the sensor signal(s) as an input to the equation characterizing the non-linear relationship and solve the equation to determine a measurement corresponding to the sensor signal(s) (e.g., a temperature in degrees Fahrenheit, a pressure in Pascals, etc.). Adjustment or modification of the numerical coefficient(s) may enable the processor 114 to calibrate the sensors 120a-c and to accurately determine a value(s) of the sensor signal(s) that may otherwise be inaccurate or imprecise. In this manner, the processor 114 may calibrate and/or correct the sensors 120a-c and/or the sensor signal(s) using the data received and requested from the remote sensing unit 102. In some examples, the corrected sensor signals may be used by the processor 114 to control a process in the process control environment 100.

In other examples, the processor 114 corrects a sensor signal(s) by applying an offset and/or a gain specified in, and read from, data stored in the memory 116 to a magnitude(s) of a digitized sensor signal(s). In such examples, a voltage and/or a current present at certain ones of the sensors 120a-c and indicative of a magnitude of a process variable being sensed, measured, and/or detected may be imprecisely (e.g., outside of a range of acceptable tolerance) amplified or attenuated between certain ones of the sensors 120a-c and the A/D converter 112. The signal conditioning circuits 122a-b may imprecisely amplify or attenuate the sensor signal(s), thereby rendering the sensor signal(s) inaccurate, imprecise, or erroneous. Therefore, a corresponding digital sensor signal(s) provided to the processor 114 from the A/D converter 112 may also be rendered inaccurate, imprecise, or erroneous. In this manner, the processor 114 may use the data requested and received from the processor 126 to correct the sensor signal(s) to an accurate magnitude(s) or value(s) sensed at ones of the sensors 120a-c and to account for amplification and attenuation effects caused by ones of the signal conditioning circuits 122a-c.

While an example manner of implementing the example remote sensing unit 102 and the local control unit 104 is illustrated in FIG. 1, one or more of the elements, processes and/or devices illustrated in FIG. 1 may be combined, divided, re-arranged, omitted, eliminated and/or implemented in any other way. Further, the example level detector 108, the example A/D converter 112, the example processor 114, the example memory 116, the example switch 118, the example processor 126, and the example memory 128 may be implemented by hardware, software, firmware and/or any combination of hardware, software and/or firmware. Thus, for example, any of the example level detector 108, the example A/D converter 112, the example processor 114, the example memory 116, the example switch 118, the example processor 126, and the example memory 128 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example level detector 108, the example A/D converter 112, the example processor 114, the example memory 116, the example switch 118, the example processor 126, and the example memory 128 are hereby expressly defined to include a tangible computer readable storage device or storage disk such as a memory, a digital versatile disk (DVD), a compact disk (CD), a Blu-ray disk, etc. storing the software and/or firmware. Further still, the example remote sensing unit 102 and the example local control unit 104 may include one or more elements, processes and/or devices in addition to, or instead of, those illustrated in FIG. 1, and/or may include more than one of any or all of the illustrated elements, processes and devices.

Figure 2:
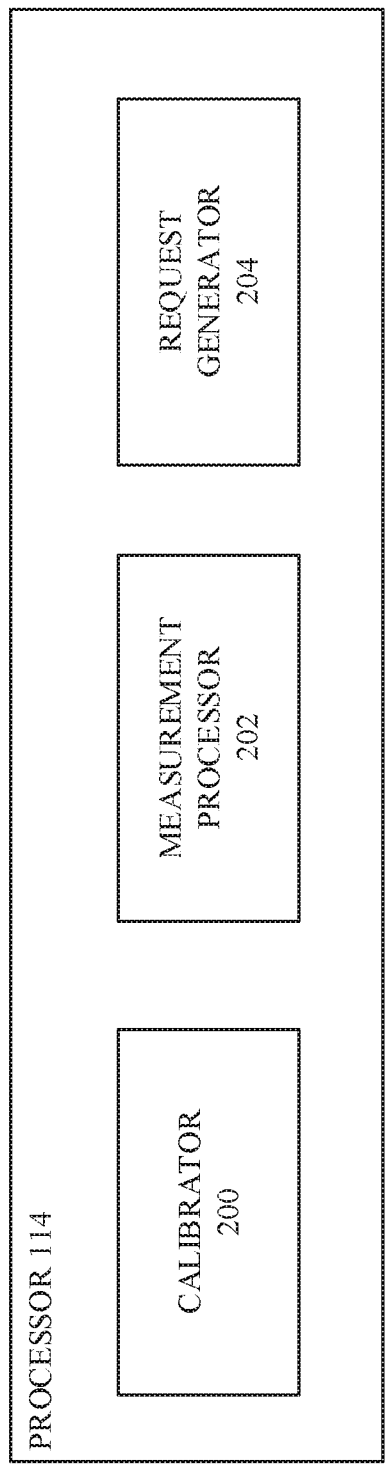
FIG. 2 is a block diagram of an example processor that may be implemented in the example local control unit of FIG. 1.

FIG. 2 is a block diagram depicting an example implementation of the example processor 114 of FIG. 1. In the illustrated example, the processor 114 includes an example calibrator 200, an example measurement processor 202, and an example request generator 204.

The example calibrator 200 calibrates the sensors 120a-c and/or the sensor signals received from the sensors 120a-c (FIG. 1). The calibrator 200 accesses data from the memory 116 and receives digitized sensor signals from the A/D converter 112. In examples disclosed herein, the calibrator 200 may adjust or modify numerical coefficients defined by equations characterizing relationships between the sensors 120a-c or the sensor signals and the process variable, the parameter, and/or the characteristic being sensed, measured, and/or detected. In such examples, adjustment or modification of numerical coefficients enables more accurate analysis of sensor signals and accounts for manufacturing variations between the sensors 120a-c. The calibrator 200 may also apply offsets or gains to a sensor signal to compensate for anticipated amplification or attenuation effects.

The example measurement processor 202 generates or determines measurements or physical quantities representative of sensor signals. In examples disclosed herein, the measurement processor 202 uses the data and/or any other means for relating electrical units of measure to physical quantities to generate measurements. The measurement processor 202 may also compare a generated measurement to a recommended operating point or range of operation and control a process. For example, the measurement processor 202 may determine a measurement is indicative of a process operating outside of a recommended operating range. In such examples, subsequent to analyzing the measurement, the measurement processor 202 may control a process by sending a signal to an actuator to control a process. In examples disclosed herein, the measurement processor 202 may receive calibrated or corrected sensor signals from the calibrator 200 which may be used to accurately generate measurements.

The example request generator 204 generates a request for data to initiate retrieval of the data from the remote sensing unit 102 (FIG. 1). In some examples, the request generator 204 may generate and transmit a signal to the switch 118 of FIG. 1 to initiate activation of the processing unit 110. In examples disclosed herein, the request generator 204 may determine whether a request for data from the remote sensing unit 102 is necessary. In such examples, the request generator 204 may access the memory 116 to determine whether the memory 116 stores data. If the memory 116 stores data, the request generator 204 may access the memory 116 to determine whether the data stored therein is associated with the sensors 120a-c to which the local control unit 104 is presently connected. In this manner, the request generator 204 may determine whether transmission of data from the processor 126 is required to facilitate correction, calibration, and/or compensation of the sensors 120a-c and/or the sensors signals. Additionally, the request generator 204 may determine whether the local control unit 104 is connected to a new or different remote sensing unit 102, which thereby requires transmission of new or different data.

Figure 3:
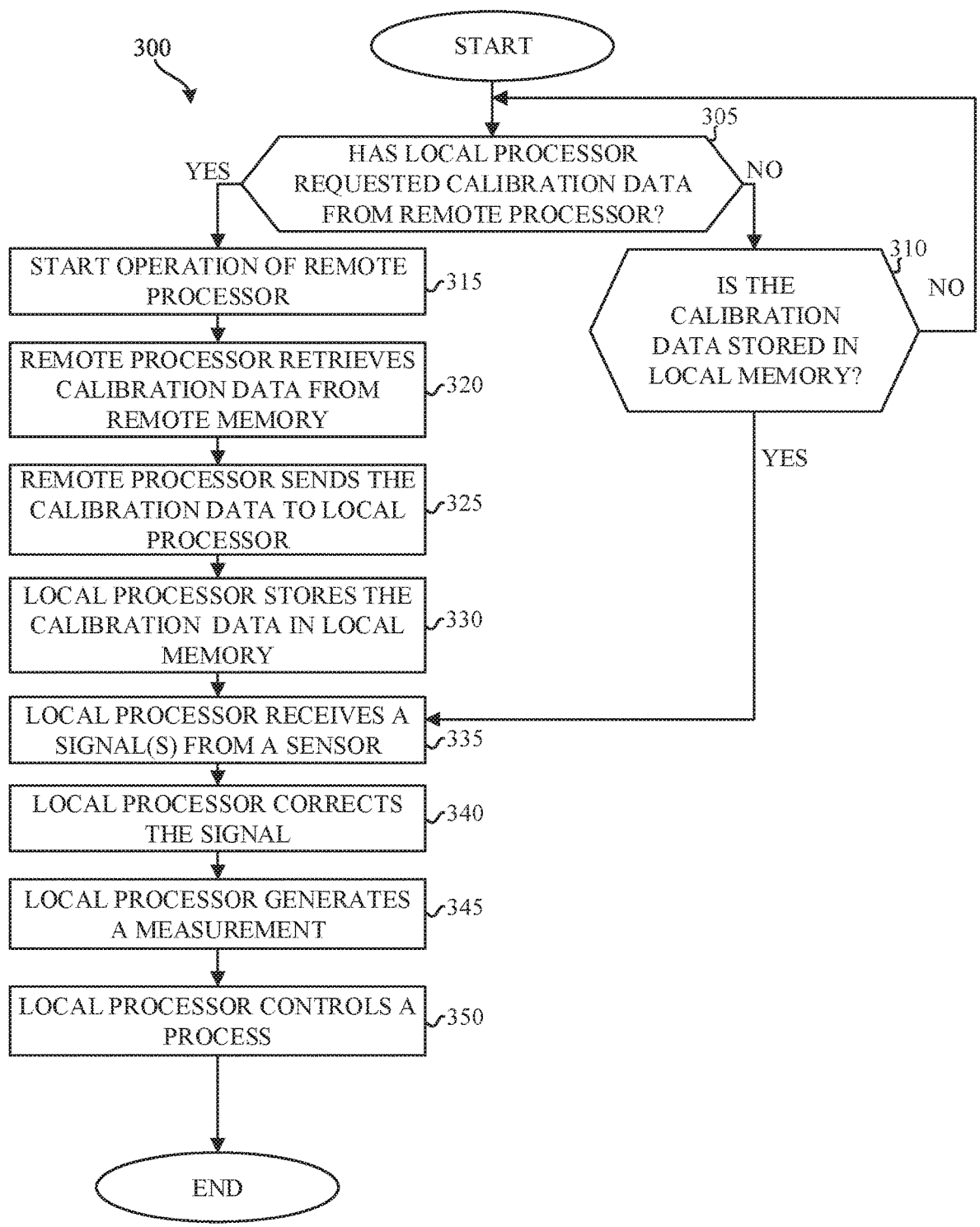
FIG. 3 is a flowchart representative of an example method that may be performed to implement the example local control unit and the example remote sensing unit of FIG. 1.

FIG. 3 is a flowchart representative of an example method 300 that may be performed to implement the example remote sensing unit 102 and the example local control unit 104 of FIG. 1. The example method 300 begins when the local processor 114 determines whether to request calibration data from the remote processor 126 (block 305). It should be noted that the calibration data may include compensation data, correction data, lookup tables, etc. In examples disclosed herein, the local processor 114 may determine whether to request the calibration data from the remote processor 126 by identifying and/or determining an operational condition or status (e.g., normal operation, calibration period, commissioning period, outage, etc.) of the process control environment 100. If the local processor 114 has not requested the calibration data from the remote processor 126 at block 305, the processor 114 determines whether the calibration data is already stored (e.g., or, rather, whether the calibration data has been previously transferred from the remote processor 126) in the local memory 116 (block 310). As noted above, the local processor 114 may not request the calibration data if the remote sensing unit 102 and the local control unit 104 are operating normally. If the local processor 114 determines that a request for the calibration data has yet to be performed (block 305 returns a result of NO), the example method 300 proceeds to block 310. At block 310, if the local processor 114 determines that the calibration data is not stored in the local memory 116, the example method 300 returns control to block 305.

If the local processor 114 has requested the calibration data from the remote processor 126 (block 305), the local processor 114 starts operation of the remote processor 126 (block 315). In examples disclosed herein, the local processor 114 may transmit a signal to the switch 118 (FIG. 1), which subsequently provides one of the reference voltages $V_{REF,1}$ 138, $V_{REF,2}$ 140 to the level detector 108, where the one of the reference voltages $V_{REF,1}$ 138, $V_{REF,2}$ 140 is different than a reference voltage provided to the level detector 108 during normal operation. The level detector 108 detects a change in voltage or satisfaction of a threshold value and subsequently provides electrical power to the processing unit 110. The processing unit 110 is activated and the remote processor 126, the remote memory 128, and the operational amplifier 130 are turned on. It should be understood that the signal(s) provided to the switch 118 and the electrical power provided to the processing unit 110 may be provided for any amount or period of time, thereby activating the processing unit 110 for any amount or period of time. In such examples, the local processor 114 may interrupt normal operation of the process control environment 100 at any point in time to initiate operation of the processing unit 110. Additionally, the local processor 114 may request the calibration data from the remote processor 126 (e.g., and thereby start operation of the remote processor 126) at any periodic or aperiodic interval during a commissioning period, a calibration period, and/or an outage.

The remote processor 126 then retrieves the calibration data from the remote memory 128 (block 320). The remote processor 126 accesses the remote memory 128, obtains the calibration data, and prepares the calibration data for delivery. Next, the remote processor 126 sends the calibration data to the local processor 114 (block 325). The local processor 114 subsequently receives the calibration data and prepares to store the calibration data. Ensuing reception of the calibration data, the local processor 114 stores the calibration data in the local memory 116 (block 330).

Returning to block 310, if the local processor 114 determines that the calibration data is stored (e.g., or, rather, that the calibration data has been previously transmitted from the remote processor 126) in the local memory 116 (block 310), the local processor 114 may determine that requesting the calibration data is unnecessary. In such examples, the local processor 114 determines that the calibration data is accessible from the local memory 116 and blocks 315-330 are bypassed. As such, the local processor 114 identifies that the local memory 116 includes the calibration data stored thereon and that requesting the calibration data again would be redundant. The local processor 114 then receives a sensor signal(s) from the sensors 120a-c (block 335). However, it should be noted that the sensor signal(s) and the calibration data may be delivered to the local processor 114 substantially simultaneously or concurrently (e.g., blocks 315-330 and block 335 occur at substantially the same time). Moreover, it should be noted that blocks 315-330 may be executed before, during, and/or after the sensor signal(s) is received.

In some examples, the local processor 114 may log or store the sensor signal(s) in the local memory 116 with respect to a time(s) the sensor signal(s) is received. Upon reception of the sensor signal(s) (block 335), the local processor 114 may determine that the calibration data enables the local processor 114 to derive a measurement from the sensor signal(s). For example, the local processor 114 may determine whether the calibration data can be applied to the sensor signal(s) to determine a measurement such as, for example, a physical quantity representative of natural gas pressure flowing via a valve.

Subsequent to receiving the sensor signal(s) in the example method 300 (block 335), the local processor 114 corrects the sensor(s) signal (block 340). For example, the local processor 114 may correct the sensor signal(s) by applying an offset or gain. In some examples, the local processor 114 digitally corrects the sensor signal(s). In other examples, the local processor 114 uses the calibration data to correct, compensate, and/or calibrate the sensors 120a-c. Alternatively, in some examples, the local processor 114 may determine that the sensor signal(s) is precise or accurate and does not require correcting. In such examples, block 340 may be bypassed.

Following block 340, the local processor 114 generates a measurement (block 345). In examples disclosed herein, the local processor 114 may interpret and analyze the sensor signal(s) with respect to the calibration data and generate a measurement or a measurement value. For example, the local processor 114 may generate a measurement representative of a pressure of natural gas in a valve by comparing the sensor signal(s) to the calibration data. In some examples, the local processor 114 may log or store the measurement in the local memory 116. Additionally, the local processor 114 may subsequently identify that the generated measurement and the sensor signal(s) indicate a process is operating outside of a recommended range of operation. For example, the local processor 114 may determine that natural gas pressure within a valve is outside of a recommended range of operation.

In some examples, the processor 114 uses the measurement, the sensor signal(s), and/or the calibration data to control a process (block 350). In examples disclosed herein, the local processor 114 may control pressure and/or flow of natural gas via a valve upon determination of the measurement. As such, the local processor 114 may send a signal(s) to a valve actuator or any other suitable means for controlling a process to decrease or increase pressure within a process environment. For example, the local processor 114 may cause a valve actuator to change position within the valve to increase or decrease fluid flow. An example implementation of controlling a process with the local processor 114 is described in connection with FIG. 4. In some examples, the method 300 bypasses block 350 when the local processor 114 determines a process can remain operating without any adjustments or modifications. After execution of block 350, the example method 300 ends. However, in some examples, the example method 300 may return to block 305, 310, or 330.

While the example method 300 is represented as a serial procedure, the method 300 of FIG. 3 may be implemented in any other fashion. For example, the method 300 of FIG. 3 may be implemented in a parallel fashion such that multiple blocks may be processed concurrently.

Examples disclosed herein enable detaching, de-coupling, or removing the remote sensing unit 102 from the local control unit 104. In such examples, the remote sensing unit 102 may be removed from the local control unit 104 and replaced with a new or different remote sensing unit 102.

In examples disclosed herein, the connections 124a-c, 142, 144 may be disconnected from the local control unit 104 and/or the remote sensing unit 102, thereby disabling communication between the two entities. A new or different remote sensing unit 102 may be implemented in the process control environment 100 by connecting the new or the different remote sensing unit 102 to the local control unit 104. As such, the new or the different remote sensing unit 102 may include a new or different remote processor 126, remote memory 128, and new or different sensors 120a-c and signal conditioning circuits 122a-c. The new or different remote memory 128 may include data associated with the new or different sensors 120a-c that is different than the data stored in the remote memory 128 of the removed remote sensing unit 102. As a result, the local processor 114 may request data from the new or different remote processor 126 in a manner similar to that described in the example method 300 of FIG. 3. In some examples, the request for data by the local processor 114 may follow replacement of the remote sensing unit 102 and/or installation of the new or different remote sensing unit 102.

The example method 300 of FIG. 3 may be implemented using machine readable instructions that comprise a program for execution by a processor such as the processor 512 shown in the example processor platform 500 discussed below in connection with FIG. 5. The program may be embodied in software stored on a tangible computer readable storage medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 3, many other methods of implementing the example method 300 may alternatively be used. For example, the order of execution of the blocks may be changed, and/or some of the blocks described may be changed, eliminated, or combined.

As mentioned above, the example method 300 of FIG. 3 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example method 300 of FIG. 3 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 4:
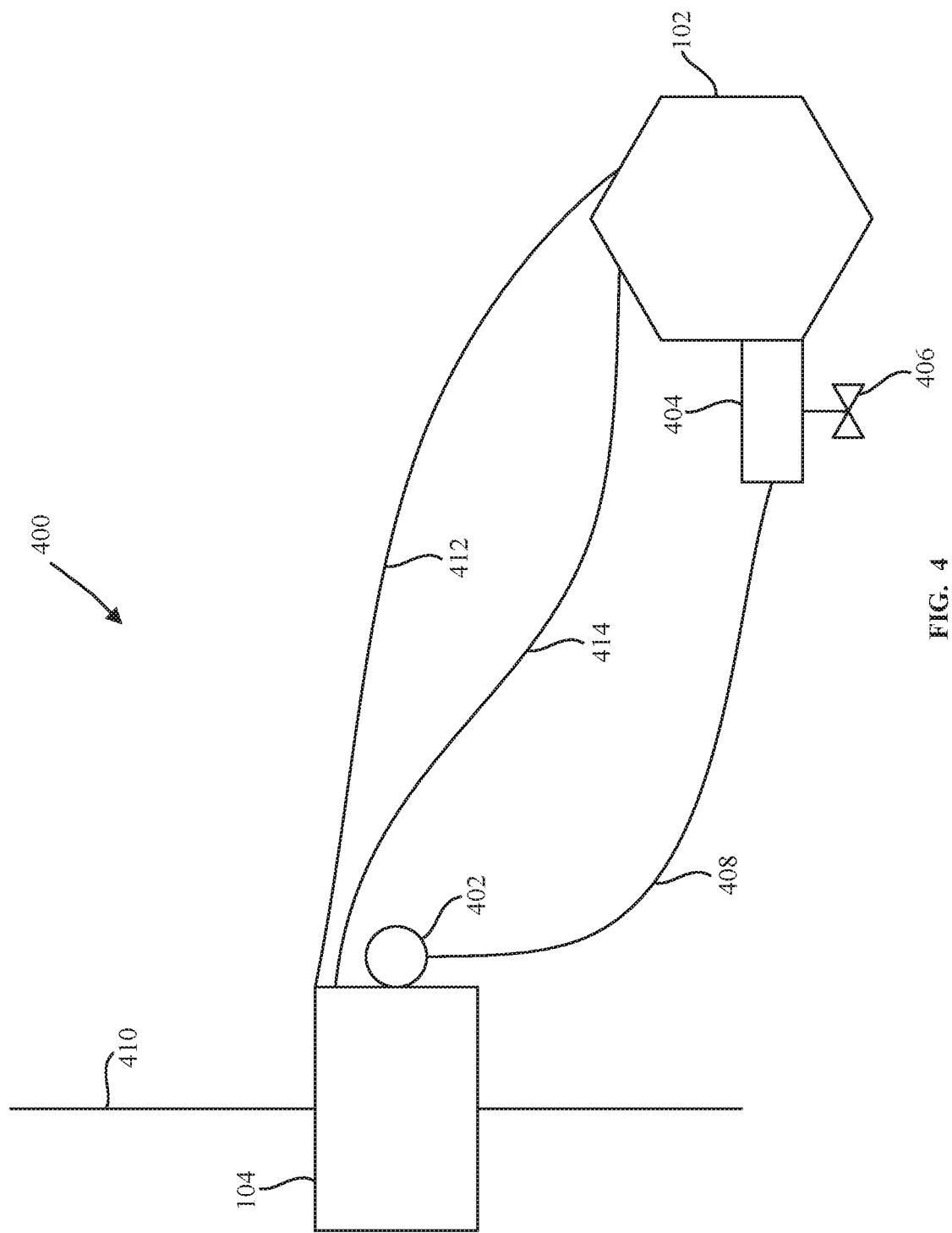
FIG. 4 is an example environment in which the example local control unit and the example remote sensing unit of FIG. 1 may be used.

FIG. 4 depicts an example process control environment 400 that enables correction of remote sensor signals. The process control environment 400 includes the remote sensing unit 102, the local control unit 104, an example pneumatic relay 402, an example actuator 404, and an example valve 406.

In the illustrated example of FIG. 4, the pneumatic relay 402 receives a supply pressure and a control signal and delivers (e.g., increases or decreases) a pneumatic output. In examples disclosed herein, the pneumatic relay 402 conducts compressed air or any other suitable pressurized fluid. The pneumatic relay 402 is mounted to or otherwise appended to the local control unit 104. In some examples, the pneumatic relay 402 is included within the local control unit 104 if the local control unit 104 is a Fisher® FIELD-VUE™ DVC6205 digital valve controller developed and sold by Emerson Process Management®. The pneumatic relay 402 is controlled by the local control unit 104 and delivers a pneumatic output (e.g., air pressure) to control a process monitored by the remote sensing unit 102.

In examples disclosed herein, the actuator 404 receives the pneumatic output from the pneumatic relay 402 and responds by adjusting position of the actuator 404 to control the process monitored by the remote sensing unit 102. The actuator 404 is coupled to or located within the valve 406. The example sensor circuitry 106 (FIG. 1) may be immersed or submerged in a fluid controlled by the valve 406 to monitor process elements and/or may be connected to the actuator 404 to monitor a position of the actuator 404.

The pneumatic relay 402 delivers a pneumatic output to the actuator 404 via an example connection 408. The connection 408 may be a tube, pipe, or any other suitable means for delivering a pneumatic signal (e.g., air, natural gas, etc.). The actuator 404 receives the pneumatic output delivered from the pneumatic relay 402 and subsequently adjusts its position to offset the process controlled in the valve 406. For example, the actuator 404 may open the valve 406 to allow fluid to flow or close the valve 406 to prevent or cease fluid flow. In examples disclosed herein, the remote sensing unit 102 continuously monitors the valve 406 and/or the actuator 404. Additionally, the local control unit 104 continuously communicates with the remote sensing unit 102 and controls the pneumatic relay 402.

In the illustrated example, the local control unit 104 is mounted to an example pipe stand 410 situated in the process control environment 400. The local control unit 104 is connected to the remote sensing unit 102 via example connections 412, 414. The connection 412 may be implemented by the example connections 124a-c of FIG. 1. Additionally, the connection 414 may be implemented by the example connections 142, 144 of FIG. 1.

In examples disclosed herein, the remote sensing unit 102 senses, measures, or detects process elements controlled via the valve 406 and/or a position(s) of the actuator 404. The remote sensing unit 102 subsequently transmits sensor signals to the local control unit 104 via the connection 412. The local control unit 104 receives the sensor signals and the processor 114 (FIG. 1) calibrates, corrects, and/or compensates the sensor signals. In some examples, the processor 114 is unable to identify appropriate data stored within the memory 116 to calibrate, correct, and/or compensate the sensor signals and requests data from the remote sensing unit 102 via the connection 414. In such examples, the processor 114 sends a signal to the switch 118 and subsequently activates the processing unit 110 of the remote sensing unit 102. The processor 126 (FIG. 1) subsequently accesses and retrieves data from the memory 128 and transmits the data to the processor 114 via the connection 414. The processor 114 subsequently stores the data in the memory 116 and calibrates, compensates, and/or corrects the sensor signals. The processor 114 may subsequently determine a measurement associated with the sensor signals and seek to control the actuator 404 to control a process. In examples disclosed herein, the processor 114 may send a signal to and/or otherwise communicate with the pneumatic relay 402 to control a process via the valve 406.

Figure 5:
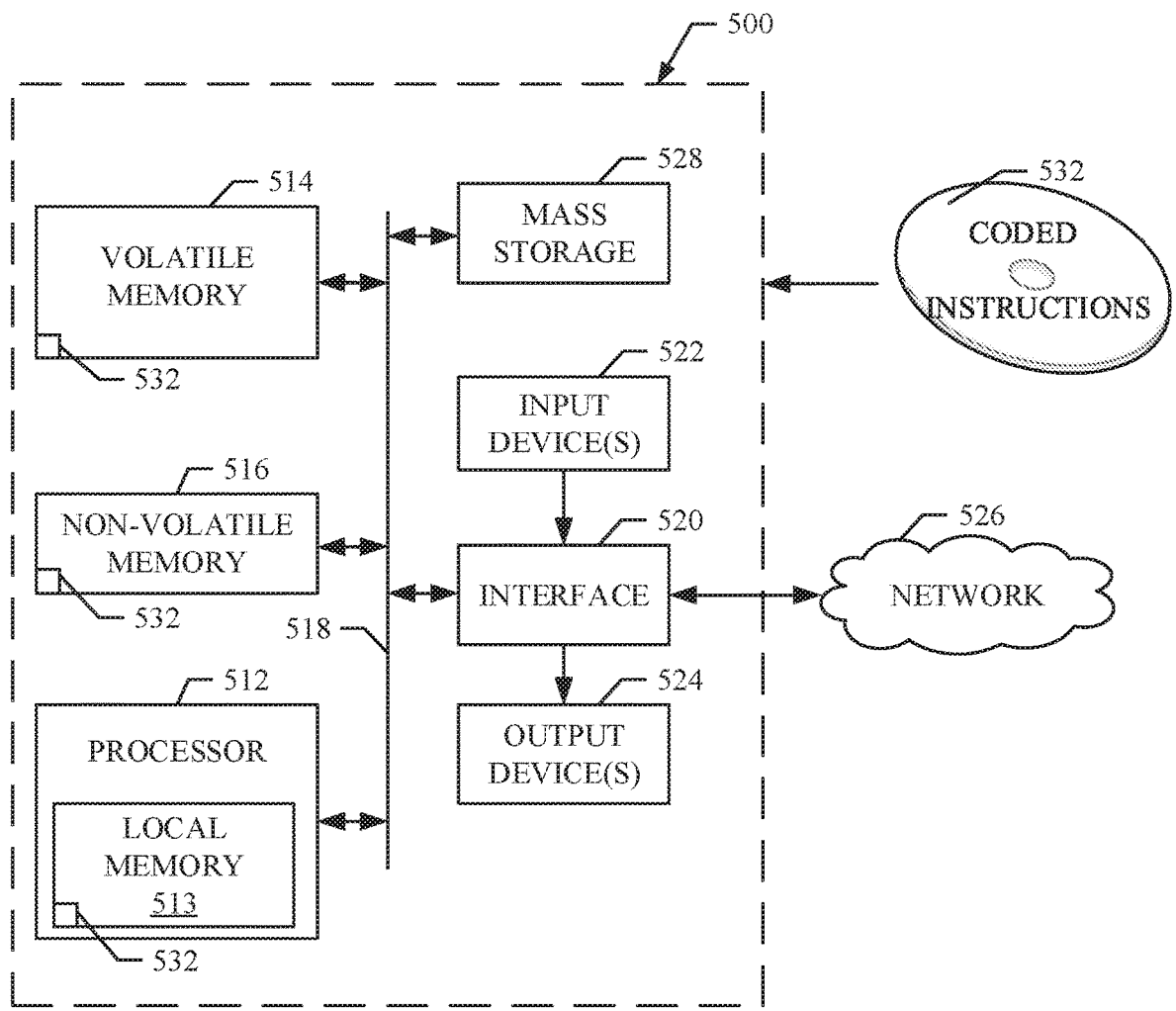
FIG. 5 is a block diagram of an example processor platform that may implement the example local control unit and/or the example remote sensing unit of FIGS. 1 and/or 4 and/or the example method of FIG. 3.

FIG. 5 is a block diagram of an example processor platform 500 capable of executing instructions to implement the example method 300 of FIG. 3 and the example level detector 108, the example A/D converter 112, the example processor 114, the example memory 116, the example switch 118, the example processor 126, and the example memory 128 of FIG. 1. The processor platform 500 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 500 of the illustrated example includes a processor 512. The processor 512 of the illustrated example is hardware. For example, the processor 512 can be implemented by one or more integrated circuits, logic circuits, microprocessors or controllers from any desired family or manufacturer.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

Coded instructions 532 to implement the example method 300 of FIG. 3 may be stored in the mass storage device 528, in the volatile memory 514, in the non-volatile memory 516, and/or on a removable tangible computer readable storage medium such as a CD or DVD.

From the foregoing, it will be appreciated that the above disclosed methods and apparatus correct, compensate, and/or calibrate sensor signals at a remote location relative to a location where such sensor signals are generated. This functionality enables the local control unit to more accurately control processes and monitor sensor signals. As such, a harsh environment with potential to compromise operation of the processor or memory of the remote sensing unit does not affect operation of a process being monitored and/or controlled by the local control unit. The local control unit continues to receive sensor signals or measurements from the remote sensing device and corrects or compensates such sensor signals or measurements at the local control unit, which is not exposed to the harsh environment.

It will also be appreciated that the above disclosed methods and apparatus support interchangeability and replacement of remote sensing units. This functionality enables remote sensing devices to be replaced in response to life-cycle expiration or other complications.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method of correcting a signal associated with sensor data in a process control environment, the method comprising:
    measuring, via a sensor of a remote sensing unit located in the process control environment, a parameter of the process control environment;
    comparing, at a local processor of a local control unit remotely situated from the process control environment, the parameter to a threshold to determine a presence of an operating condition of the process control environment, the operating condition having a potential to cause a malfunction of a remote processor of the remote sensing unit, the remote processor proximate the sensor;
    based on the determined presence of the operating condition, turning on the remote processor of the remote sensing unit;
    retrieving, with the remote processor, calibration data stored in a first memory proximate to the remote processor when the remote processor is turned on, the calibration data associated with the sensor;
    sending, with the remote processor, the calibration data to the local processor;
    storing, in a second memory proximate to the local processor, the calibration data sent to the local processor;
    receiving, at the local processor, a signal from the sensor;
    correcting, with the local processor, the signal based on the calibration data; and
    controlling, with the local processor, a process control device in the process control environment based on the corrected signal.

2. The method according to claim 1, further including connecting to the local processor a second sensor and a second remote processor associated with and proximate to the second sensor, wherein second calibration data associated with the second sensor is stored in a third memory proximate to the second remote processor.

3. The method according to claim 1, wherein the calibration data is sent to the local processor independent of any user instruction.

4. The method according to claim 1, wherein the local processor determines a measurement based on the corrected signal.

5. The method according to claim 1, wherein power provided to the remote processor of the remote sensing unit is to be turned off in response to determining an adverse condition of the process control environment.

6. The method according to claim 1, wherein the process control device is a valve disposed in the process control environment.

7. The method according to claim 1, wherein the process control environment is associated with at least one of an industrial plant or a factory.

8. An apparatus to correct a signal associated with sensor data in a process control environment, the apparatus comprising:
- a sensor to generate a signal based on a measured parameter associated with a process control device in the process control environment, the sensor located proximate the process environment;
- a first memory to store calibration data associated with the sensor;
- a second memory to store the calibration data, the second memory remotely situated from the process control environment;
- a remote processor proximate to the sensor and the first memory, the remote processor to retrieve the calibration data from the first memory;
- a local processor proximate to the second memory and remotely situated relative to the process control environment, the local processor to receive the signal from the sensor and compare the signal to a threshold to determine a presence of an operating condition of the process control environment, the operating condition having a potential to cause a malfunction of the remote processor, based on the determined presence of the operating condition, the local processor is to:
  - turn on the remote processor and receive the calibration data from the remote processor,
  - correct the signal based on the calibration data, and
  - control the process control device based on the corrected signal;
- a first wired connection to communicatively couple the sensor and the local processor; and
- a second wired connection to communicatively couple the remote processor and the local processor, the second wired connection being separate from the first wired connection.

9. The apparatus according to claim 8, wherein the remote processor is to send the calibration data based on a request from the local processor to the remote processor.

10. The apparatus according to claim 9, wherein the remote processor is to be powered off prior to the local processor requesting the calibration data.

11. The apparatus according to claim 8, wherein the remote processor is to send the calibration data to the local processor independent of any user instruction.

12. The apparatus according to claim 8, wherein the local processor determines a measurement based on the corrected signal.

13. The apparatus according to claim 8, further including a level detector to:
- detect a voltage of a request signal provided by the local processor;
- deliver power to the remote processor when the voltage satisfies a threshold value; and
- prevent delivery of the power to the remote processor when the voltage does not satisfy the threshold value.

14. The apparatus according to claim 13, wherein the local processor is to cause the voltage of the request signal to satisfy the threshold value during at least one of a commissioning period, a calibration period, or an outage, and to cause the voltage of the request signal to not satisfy the threshold value during normal operation of the process control environment.

* * * * *